US008765621B2

(12) United States Patent
Kawano et al.

(10) Patent No.: US 8,765,621 B2
(45) Date of Patent: Jul. 1, 2014

(54) DIELECTRIC CERAMIC COMPOSITION FOR HIGH-FREQUENCY USE AND METHOD FOR PRODUCING THE SAME, AS WELL AS DIELECTRIC CERAMIC FOR HIGH-FREQUENCY USE AND METHOD FOR PRODUCING THE SAME AND HIGH-FREQUENCY CIRCUIT ELEMENT USING THE SAME

(75) Inventors: Takafumi Kawano, Yamaguchi (JP); Masataka Yamanaga, Yamaguchi (JP); Atsushi Okabe, Yamaguchi (JP)

(73) Assignee: UBE Industries, Ltd., Yamaguchi (JP)

(*) Notice: Subject to any disclaimer, the term of this patent is extended or adjusted under 35 U.S.C. 154(b) by 385 days.

(21) Appl. No.: 13/131,119

(22) PCT Filed: Nov. 25, 2009

(86) PCT No.: PCT/JP2009/069844
§ 371 (c)(1),
(2), (4) Date: May 25, 2011

(87) PCT Pub. No.: WO2010/061842
PCT Pub. Date: Jun. 3, 2010

(65) Prior Publication Data
US 2011/0236634 A1 Sep. 29, 2011

(30) Foreign Application Priority Data

Nov. 25, 2008 (JP) .................... 2008-299533
Mar. 30, 2009 (JP) .................... 2009-081911
Mar. 30, 2009 (JP) .................... 2009-081912

(51) Int. Cl.
*C04B 35/20* (2006.01)
*C04B 35/465* (2006.01)
*H01P 7/10* (2006.01)
*H01B 3/12* (2006.01)
*C04B 35/457* (2006.01)

(52) U.S. Cl.
CPC .. *H01P 7/10* (2013.01); *H01B 3/12* (2013.01); *C04B 35/20* (2013.01); *C04B 35/457* (2013.01); *C04B 35/465* (2013.01); *C04B 2235/3445* (2013.01); *C04B 2235/3293* (2013.01); *C04B 2235/3236* (2013.01)
USPC .................... 501/122; 501/136; 333/219.1

(58) Field of Classification Search
CPC ............ H01P 7/10; H01B 3/12; C04B 35/20; C04B 35/457; C04B 35/465; C04B 2235/3445; C04B 2235/3293; C04B 2235/3236
USPC ................... 501/122, 136; 333/219.1
See application file for complete search history.

(56) References Cited

U.S. PATENT DOCUMENTS 7,160,826 B2 * 1/2007 Miyauchi et al. ............. 501/136

FOREIGN PATENT DOCUMENTS

JP          62-103904 A      5/1987
(Continued)

OTHER PUBLICATIONS

Tsunooka, T. et al.: "Effects of $TiO_2$ on sinterability and dielectric properties of high-Q forsterite ceramics", *Journal of the European Ceramic Society*, 23 (2003), pp. 2573-2578.
(Continued)

*Primary Examiner* — Karl Group
(74) *Attorney, Agent, or Firm* — Frommer Lawrence & Haug LLP; Ronald R. Santucci

(57) ABSTRACT

There is provided a dielectric ceramic composition for high-frequency use represented by a composition formula of $a(Sn,Ti)O_2\text{-}bMg_2SiO_4\text{-}cMgTi_2O_5\text{-}dMgSiO_3$. In the composition formula, a, b, c and d (provided that a, b, c and d are mol %) are within the following ranges: $4 \leq a \leq 37$, $34 \leq b \leq 92$, $2 \leq c \leq 15$ and $2 \leq d \leq 15$, respectively, and $a+b+c+d=100$. The dielectric ceramic composition for high-frequency use has a relative permittivity $\in_r$ of 7.5-12.0, a $Q_m \times f_o$ value of not less than 50000 (GHz) and an absolute value of a temperature coefficient $\tau_f$ of resonance frequency $f_o$ of not more than 30 ppm/° C.

11 Claims, 7 Drawing Sheets

(56) References Cited

FOREIGN PATENT DOCUMENTS

| | | |
|---|---|---|
| JP | 06-199568 A | 7/1994 |
| JP | 06-236708 A | 8/1994 |
| JP | 07-201223 A | 8/1995 |
| JP | 08-335810 A | 12/1996 |
| JP | 2000-143336 A | 5/2000 |
| JP | 2000-344571 A | 12/2000 |
| JP | 2001-130952 A | 5/2001 |
| JP | 20100024082 * | 2/2010 |
| WO | WO 2004/106261 A | 12/2004 |

OTHER PUBLICATIONS

"A Ka-band Diplexer Using Planar TE Mode Dielectric Resonators with Plastic Package", *Metamorphosis*, No. 6, (2001), pp. 38-39 In Japanese With Abridged English Translationi.

Chronological Scientific Tables 2007 Edition, In Japanese With Abridged English Translation.

\* cited by examiner

DIELECTRIC CERAMIC COMPOSITION FOR HIGH-FREQUENCY USE AND METHOD FOR PRODUCING THE SAME, AS WELL AS DIELECTRIC CERAMIC FOR HIGH-FREQUENCY USE AND METHOD FOR PRODUCING THE SAME AND HIGH-FREQUENCY CIRCUIT ELEMENT USING THE SAME

This application is a 371 of PCT/JP2009/069844 filed on Nov. 25, 2009, published on Mar. 3, 2010 under publication number WO 2010/061842 A which claims priority benefits from Japanese Patent Application No. 2008-299533 filed Nov. 25, 2008 and Japanese Patent Application No. 2009-081911 filed Mar. 30, 2009 and Japanese Patent Application No. 2009-081912 filed Mar. 30, 2009, the disclosures of which are incorporated herein by reference.

TECHNICAL FIELD

This invention relates to a dielectric ceramic composition for high-frequency use, and more particularly to a dielectric ceramic composition for high-frequency use wherein a relative permittivity $\in_r$ is 7.5-12.0, a $Q_m \times f_o$ value is sufficiently large, and an absolute value of a temperature coefficient $\tau_f$ of resonance frequency $f_o$ is not more than 30 ppm/° C. Also, this invention relates to a method for producing the above-mentioned dielectric ceramic composition for high-frequency use.

Further, this invention relates to a dielectric ceramic for high-frequency use which is suitable as a member constituting a high-frequency circuit element used in a high-frequency region such as microwave, milliwave or the like. As an example of such a dielectric ceramic for high-frequency use are mentioned, for example, a dielectric block or a dielectric substrate as constitutive members for dielectric resonators, dielectric waveguides, dielectric antennae and so on, and further a substrate and a supporting member used for various types of high-frequency circuit elements, and so on. The high-frequency circuit element constitutes, for example, an electronic apparatus such as a communication equipment for a high-frequency region or the like.

BACKGROUND ART

Recently, a frequency used for communication is expanding to a high-frequency region of microwave region or milliwave region along with a rapid development of communication networks. As a dielectric ceramic composition used to produce an electronic component for such a high-frequency circuit (electronic component for high-frequency use), there is required a material wherein the loss coefficient $Q_m$ (may be also referred to as Q simply) value is large and further the absolute value of the temperature coefficient $\tau_f$ of resonance frequency $f_o$ is small and can be easily adjusted to a desired value.

As the value of the relative permittivity $\in_r$ of a dielectric ceramic composition for high-frequency use becomes larger, the size of an electronic component for high-frequency use constituting a high-frequency circuit such as a microwave circuit, a milliwave circuit or the like can be reduced. However, when the relative permittivity $\in_r$ of the dielectric ceramic composition for high-frequency use used for the electronic component for high-frequency use is too large in high-frequency regions of microwave and milliwave, the electronic component for high-frequency use is too small in the size and the processing accuracy is severe and hence the productivity is deteriorated. Thus, the relative permittivity $\in_r$ of the dielectric ceramic composition for high-frequency use is required to be an appropriate size. The electronic component for high-frequency use varies size depending on a frequency to be used. It is, therefore, demanded that a material for an electronic component for high-frequency use can easily obtain (that is, adjust) a required relative permittivity $\in_r$ in order to achieve a high-frequency electronic component for high-frequency circuits such as microwave circuit, milliwave circuit and the like with both features of improvement of processability and miniaturization.

Heretofore, as a dielectric ceramic composition for high-frequency use, there are proposed BaO—MgO—WO₃-based materials (see Patent Document 1), MgTiO₃—CaTiO₃-based materials (see Patent Document 2) and so on. However, since each of these dielectric ceramic compositions for high-frequency use has a relative permittivity $\in_r$ of not less than 13, as the frequency used becomes higher, there is required a dielectric ceramic composition for high-frequency use having a less relative permittivity $\in_r$. Moreover, there is a problem in these dielectric ceramic compositions for high-frequency use that the relative permittivity $\in_r$ can be adjusted only within a relatively narrow range in a composition region showing an absolute value of a temperature coefficient $\tau_f$ of resonance frequency of near 0 ppm/° C.

On the other hand, alumina ($Al_2O_3$), forsterite ($Mg_2SiO_4$), cordierite ($Mg_2Al_4Si_5O_{18}$) and so on are excellent in the $Q_m$ value, so that they can be used for a electronic circuit substrate and so on. However, since the temperature coefficient $\tau_f$ of resonance frequency is −30 to −70 ppm/° C., their use is limited. When these materials incorporate impurities, there is a problem of having a major influence on a formation phase and electric properties, or the like.

There is further proposed a ceramic composition composed of forsterite ($Mg_2SiO_4$), calcium titanate ($CaTiO_3$) and spinel (see Patent Document 3). However, although Patent Document 3 discloses that the temperature dependency of the relative permittivity $\in_r$ of the ceramic composition can be controlled, there is not disclosed at all a value of relative permittivity $\in_r$, or a possibility to control or adjust it.

There is also proposed a dielectric ceramic composition wherein titanium oxide ($TiO_2$) is added to forsterite ($Mg_2SiO_4$) (see Non-Patent Document 1). In the dielectric ceramic composition, the temperature coefficient $\tau_f$ of resonance frequency is gradually shifted to a plus side along with the adding of titanium oxide ($TiO_2$). However, the temperature coefficient $\tau_f$ of resonance frequency is a large negative value of −62 ppm/° C., even if 30 wt % of titanium oxide is added. Thus, it is impracticable.

By the way, the most basic dielectric resonator includes a coaxial dielectric resonator. In the coaxial dielectric resonator, a block composed of a dielectric ceramic is provided with a through-hole, and only one surface of the block in which the through-hole opens (opened surface) remains the surface of the dielectric ceramic, and a conductive film is formed on other surfaces of the dielectric ceramic and the inner surface of the through-hole.

The most basic waveguide as a high-frequency planar circuit element includes a microstrip line. In the microstrip line, one surface of front and back surfaces of a dielectric ceramic substrate is provided with a strip conductor, and another surface of the dielectric ceramic substrate is provided with a ground conductive film.

The above coaxial dielectric resonator and microstrip line can be used to constitute a microwave transmitter of a dielectric resonator control type. In the microwave transmitter, a coaxial dielectric resonator is mounted on a dielectric ceramic substrate through a supporting member composed of a dielectric ceramic, and the coaxial dielectric resonator is coupled to a microstrip line provided on the dielectric ceramic substrate with an electromagnetical field which is leaked outside the coaxial dielectric resonator.

In this kind of high-frequency circuit, a resonance system having a high non-loaded Q is constituted by suppressing leakage of electrical field through a supporting member. Thus, it is required to use a material having a low relative permittivity and a small dielectric loss (tan δ) (that is, a large $Q_m \times f_o$) as a material for a supporting member. Heretofore, as the material for a supporting member, there is used forsterite ($Mg_2SiO_4$) wherein the relative permittivity $\in_r$ is about 7 and $Q_m \times f_o$ is about 150000 GHz. As a material for a dielectric ceramic substrate, there are mainly used alumina ceramics ($Al_2O_3$) wherein the relative permittivity $\in_r$ is about 10 and $Q_m \times f_o$ is not less than 200000 GHz (for example, see Patent Document 4). However, the temperature coefficient $\tau_f$ of resonance frequency of these materials is prone to take −30 to −70 ppm/° C. and hence the use of the high-frequency circuit is limited. When these materials incorporate impurities, there is a problem that the constitution of the formation phase and the electric properties vary largely, or the like.

Also, a dielectric ceramic based on the dielectric ceramic composition described in Non-Patent Document 1 is impracticable.

On the other hand, as a material for a dielectric ceramic substrate constituting a dielectric waveguide, there are generally used teflon (registered trademark) and alumina ceramics ($Al_2O_3$). However, the temperature coefficient $\tau_f$ of resonance frequency of these materials is prone to take −30 to −70 ppm/° C. and hence the use of the high-frequency circuit is limited.

There is a development example of applying a dielectric material wherein relative permittivity $\in_r=24$, $Q_m \times f_o=350000$ GHz and temperature coefficient $\tau_f$ of resonance frequency=0 ppm/° C. to a planar filter (Non-Patent Document 2), but it is required that a relative permittivity $\in_r$ is not more than about 12, $Q_m \times f_o$ is not less than 40000 GHz, preferably not less than 50000 GHz and an absolute value of a temperature coefficient $\tau_f$ of resonance frequency $f_o$ is not more than 30 ppm/° C. in order to respond to the request to heighten further a frequency in the future.

As a frequency region becomes higher, the impact of skin effect becomes larger. For example, when Ag is used as a conductive material, a skin depth at a region of 1-3 GHz is 1.18-2.04 μm (Non-Patent Document 3).

CITED DOCUMENTS LIST

Patent Document

Patent Document 1: JP-A-H6-236708 (see paragraph (0033) on page 11, and Tables 1-8)
Patent Document 2: JP-A-H6-199568 (see paragraph (0018) on page 5, and Tables 1-3)
Patent Document 3: JP-A-2000-344571 (see paragraph (0006) on page 2)
Patent Document 4: JP-A-S62-103904

Non-Patent Document

Non-Patent Document 1: Journal of the European Ceramic Society (see Vol. 23 (2003), page 2575, Table 3)
Non-Patent Document 2: A Ka-band Diplexer Using Planar TE Mode Dielectric Resonators with Plastic Package (Metamorphosis, No. 6, pp. 38-39 (2001))
Non-Patent Document 3: Chronological Scientific Tables 2007 edition

SUMMARY OF THE INVENTION

Problems to be Solved by the Invention

In view of the above-mentioned technical problems of the conventional dielectric ceramic composition for high-frequency use, it is an object of the invention to provide a dielectric ceramic composition for high-frequency use wherein a relative permittivity $\in_r$ is 7.5-12.0, a $Q_m \times f_o$ value is sufficiently large, and an absolute value of a temperature coefficient $\tau_f$ of resonance frequency $f_o$ is not more than 30 ppm/° C.

It is another object of the invention to provide a method for producing such a dielectric ceramic composition for high-frequency use.

In view of the above-mentioned technical problems of the conventional dielectric ceramic for high-frequency use, the inventors have also found that the suitable composition and relative density of the dielectric ceramic lead to more excellent electric properties in a high-frequency region, whereby the easiness of manufacturing is improved. The invention has been made on the basis of this knowledge.

That is, it is an object of the invention to provide a dielectric ceramic for high-frequency use having excellent electric properties in a high-frequency region and easily-manufactured, and a production method thereof.

It is another object of the invention to provide a high-frequency circuit element using such a dielectric ceramic for high-frequency use as a constitutive member.

In view of the above-mentioned technical problems of the conventional dielectric ceramic for high-frequency use, the inventors have further found that the suitable composition and surface roughness of the dielectric ceramic lead to more excellent electric properties in a high-frequency region. The invention has been made on the basis of this knowledge.

That is, it is an object of the invention to provide a dielectric ceramic for high-frequency use having excellent electric properties in a high-frequency region, and a production method thereof.

It is another object of the invention to provide a high-frequency circuit element using such a dielectric ceramic for high-frequency use as a constitutive member.

Means of Solving the Problems (1) First Invention

According to the invention, in order to achieve any of the above objects, there is provided a dielectric ceramic composition for high-frequency use characterized by being represented by a composition formula of $a(Sn,Ti)O_2$-$bMg_2SiO_4$-$cMgTi_2O_5$-$dMgSiO_3$ in which a, b, c and d (provided that a, b, c and d are mol %) are within the following ranges: $4 \leq a \leq 37$, $34 \leq b \leq 92$, $2 \leq c \leq 15$ and $2 \leq d \leq 15$, respectively, and $a+b+c+d=100$.

In an embodiment of the invention, the $(Sn,Ti)O_2$ is $(Sn_{0.8}Ti_{0.2})O_2$.

According to the invention, in order to achieve any of the above objects, there is also provided a method for producing the above-mentioned dielectric ceramic composition for high-frequency use characterized by comprising steps of using predetermined amounts of $SnO_2$, $TiO_2$ and $Mg_2SiO_4$ as a starting material to mix and crush them to obtain a powder, and then adding a binder to the obtained powder, molding and sintering.

(2) Second Invention

According to the invention, in order to achieve any of the above objects, there is provided a dielectric ceramic for high-frequency use characterized by comprising a main component consisting of the dielectric ceramic composition for high-frequency use and an adding component consisting of MnO, wherein 0.1-5.0 parts by weight of the adding component is added to 100 parts by weight of the main component, and wherein a relative density is not less than 95%.

In an embodiment of the invention, the dielectric ceramic for high-frequency use has a relative permittivity $\in_r$ of 7.5-12.0, a $Q_m \times f_o$ value of not less than 40000, preferably not less than 50000 and a temperature coefficient $\tau_f$ of resonance frequency $f_o$ of −30 to +30 ppm/° C.

According to the invention, in order to achieve any of the above objects, there is also provided a method for producing the above-mentioned dielectric ceramic for high-frequency use characterized by comprising steps of mixing and calcining predetermined amounts of $SnO_2$, $TiO_2$ and $Mg_2SiO_4$, and then crushing them to obtain a starting material, and then adding 0.1-5.0 parts by weight of MnO as a sintering aid based on 100 parts by weight of the starting material to obtain a powder, and thereafter adding an organic binder to the obtained powder, molding and sintering.

According to the invention, in order to achieve any of the above objects, there is further provided a high-frequency circuit element characterized by comprising a member composed of the dielectric ceramic for high-frequency use.

(3) Third Invention

According to the invention, in order to achieve any of the above objects, there is provided a dielectric ceramic for high-frequency use characterized by being composed of the dielectric ceramic composition for high-frequency use and having a surface arithmetic mean roughness Ra of not more than 2 μm.

In an embodiment of the invention, the dielectric ceramic for high-frequency use has a relative permittivity $\in_r$ of 7.5-12.0, a $Q_m \times f_o$ value of not less than 40000, preferably not less than 50000 and a temperature coefficient $\tau_f$ of resonance frequency $f_o$ of −30 to +30 ppm/° C.

According to the invention, in order to achieve any of the above objects, there is also provided a method for producing the above-mentioned dielectric ceramic for high-frequency use characterized by comprising steps of using predetermined amounts of $SnO_2$, $TiO_2$ and $Mg_2SiO_4$ as a starting material to mix and crush these starting materials to obtain a powder such that D50 of particle size distribution is not more than 2 μm, and then adding a binder to the obtained powder, molding and sintering.

According to the invention, in order to achieve any of the above objects, there is further provided a high-frequency circuit element characterized by comprising a member composed of the dielectric ceramic for high-frequency use.

Effects of the Invention

According to the invention, there is provided a dielectric ceramic composition for high-frequency use wherein a relative permittivity $\in_r$ is 7.5-12.0, a $Q_m \times f_o$ (which may be abbreviated as $Q_m f_o$, $Qf_o$, $Q_m f$, $Qf$, $Q \times f_o$, $Q_m \times f$, $Q \times f$ and the like) value is sufficiently large, and an absolute value of a temperature coefficient $\tau_f$ of resonance frequency $f_o$ is not more than 30 ppm/° C. A dielectric ceramic electronic component for high-frequency use having excellent properties with both features of improvement of processability and miniaturization is easily provided by using this dielectric ceramic composition for high-frequency use.

According to the invention, there are also provided a dielectric ceramic for high-frequency use having excellent electric properties in a high-frequency region and easily-manufactured, and more particularly a dielectric ceramic for high-frequency use capable of sintering at a relatively lower temperature wherein a relative permittivity $\in_r$ is 7.5-12.0, a $Q_m \times f_o$ value is sufficiently large, and an absolute value of a temperature coefficient $\tau_f$ of resonance frequency $f_o$ is not more than 30 ppm/° C. There is provided a high-frequency circuit element having excellent properties with both features of excellent processability and easiness of miniaturization by using this dielectric ceramic for high-frequency use as a constitutive member.

According to the invention, there are further provided a dielectric ceramic for high-frequency use having excellent electronic properties in a high-frequency region, and more particularly a dielectric ceramic for high-frequency use wherein a relative permittivity $\in_r$ is 7.5-12.0, a $Q_m \times f_o$ value is sufficiently large, and an absolute value of a temperature coefficient $\tau_f$ of resonance frequency $f_o$ is not more than 30 ppm/° C. There is provided a high-frequency circuit element having excellent properties with both features of excellent processability and easiness of miniaturization by using this dielectric ceramic for high-frequency use as a constitutive member.

MODE FOR CARRYING OUT THE INVENTION

The dielectric ceramic composition for high-frequency use according to the invention is represented by a composition formula of $a(Sn,Ti)O_2 \text{-} bMg_2SiO_4 \text{-} cMgTi_2O_5 \text{-} dMgSiO_3$. In the composition formula, a, b, c and d (provided that a, b, c and d are mol %) are within the following ranges: $4 \leq a \leq 37$, $34 \leq b \leq 92$, $2 \leq c \leq 15$ and $2 \leq d \leq 15$, respectively, and $a+b+c+d=100$.

Figure 1:
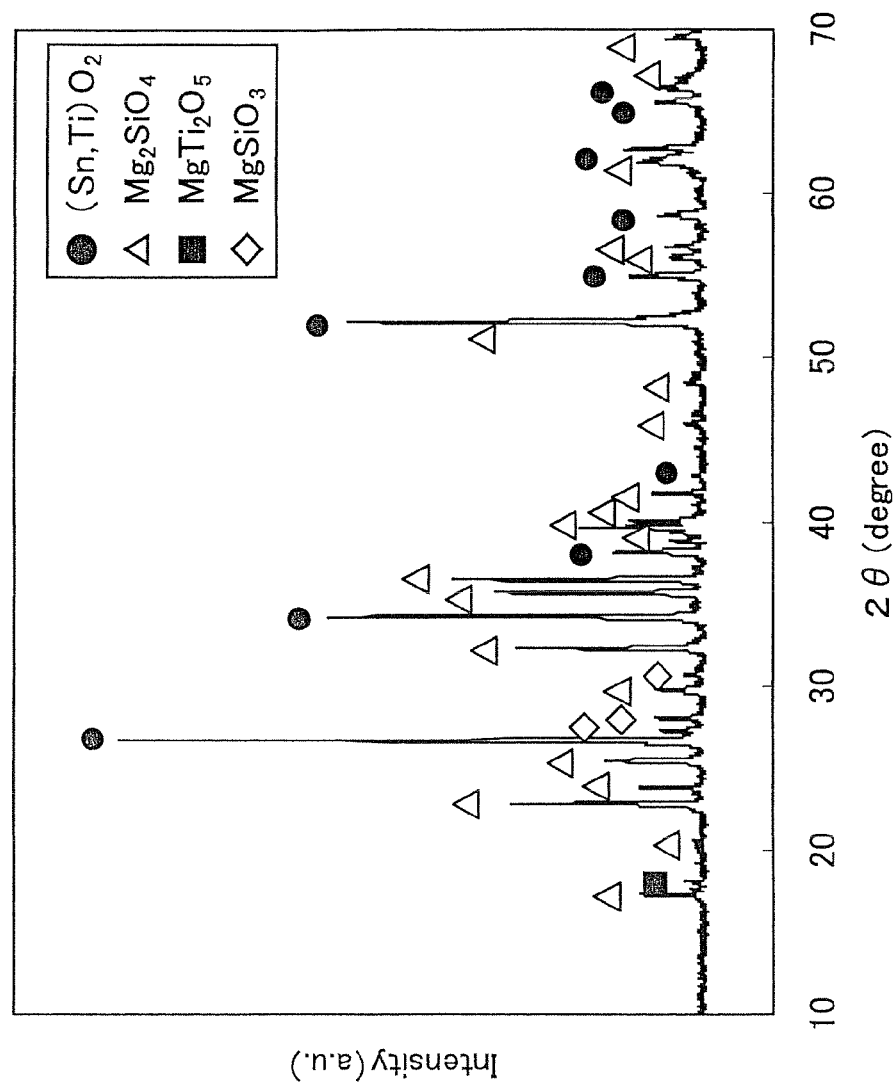
FIG. 1 is an X-ray diffraction graph of the dielectric ceramic composition for high-frequency use according to the invention.

In the dielectric ceramic composition for high-frequency use according to the invention particularly as shown in the X-ray diffraction graph of FIG. 1, tin titanate ($(Sn,Ti)O_2$), forsterite ($Mg_2SiO_4$), magnesium titanate ($MgTi_2O_5$) and steatite ($MgSiO_3$) are a main formation phase. ($Sn_{0.8}Ti_{0.2}$)$O_2$ and ($Sn_{0.2}Ti_{0.8}$)$O_2$ are known as the (Sn,Ti)$O_2$. Among them, ($Sn_{0.8}Ti_{0.2}$)$O_2$ is characterized by being easier to sinter and control $\tau_f$ than ($Sn_{0.2}Ti_{0.8}$)$O_2$.

In the dielectric ceramic composition for high-frequency use according to the invention, a $Q_m \times f_o$ value is a high value of not less than 40000 (GHz), for example, about 50000-80000 (GHz) and hence it is easy to provide a dielectric ceramic for high-frequency use having a very small dielectric loss and an electronic component using the same. The dielectric ceramic composition for high-frequency use according to the invention has an absolute value of a temperature coefficient $\tau_f$ of resonance frequency of not more than 30 ppm/° C. and hence it is easy to provide a dielectric ceramic for high-frequency use having a low impact on properties due to temperature and an electronic component using the same. The dielectric ceramic composition for high-frequency use according to the invention has a relative permittivity $\in_r$ of 7.5-12.0 and hence it is easy to provide a dielectric ceramic electronic component for high-frequency use with both features of improvement of processability and miniaturization.

Reasons for limitation regarding the composition of the dielectric ceramic composition for high-frequency use according to the invention will be described. In the composition formula of a(Sn,Ti)$O_2$-b$Mg_2SiO_4$-c$MgTi_2O_5$-d$MgSiO_3$, when a is less than 4, the temperature coefficient $\tau_f$ of resonance frequency is not preferable to be less than −30 ppm/° C. (that is, the absolute value of the temperature coefficient $\tau_f$ is more than 30 ppm/° C.). When a exceeds 37, the relative permittivity $\in_r$ is not preferable to be more than 12.0. The more preferable range of a is $18 \le a \le 36$. When it is within this range, the absolute value of the temperature coefficient $\tau_f$ of resonance frequency is not more than 20 ppm/° C. When b is less than 34, the relative permittivity $\in_r$ is not preferable to be more than 12.0. When b exceeds 92, the temperature coefficient $\tau_f$ of resonance frequency is not preferable to be less than −30 ppm/° C. (that is, the absolute value of the temperature coefficient $\tau_f$ is more than 30 ppm/° C.). The more preferable range of b is $34 \le b \le 68$. When it is within this range, the absolute value of the temperature coefficient $\tau_f$ of resonance frequency is not more than 20 ppm/° C. When c is less than 2, the temperature coefficient $\tau_f$ of resonance frequency is not preferable to be less than −30 ppm/° C. (that is, the absolute value of the temperature coefficient $\tau_f$ is more than 30 ppm/° C.). When c exceeds 15, the relative permittivity $\in_r$ is not preferable to be more than 12.0. When d is less than 2, the temperature coefficient $\tau_f$ of resonance frequency is not preferable to be less than −30 ppm/° C. (that is, the absolute value of the temperature coefficient $\tau_f$ is more than 30 ppm/° C.). When d exceeds 15, the relative permittivity $\in_r$ is not preferable to be more than 12.0.

As shown in Examples to be hereinafter described, it is able to achieve a sufficiently large $Q_m \times f_o$ value at an absolute value of a temperature coefficient $\tau_f$ of resonance frequency $f_o$ of not more than 30 ppm/° C., that is within a near-zero range of $\tau_f$, but also adjust a relative permittivity $\in_r$ to a desired value of 7.5-12.0 by changing properly molar ratios of a, b, c and d in the composition formula within the composition range of the dielectric ceramic composition for high-frequency use according to the invention.

Next, the method for producing the dielectric ceramic composition for high-frequency use according to the invention will be described. The most preferable method for producing the dielectric ceramic composition for high-frequency use according to the invention is a method of using tin oxide ($SnO_2$), titanium oxide ($TiO_2$) and forsterite ($Mg_2SiO_4$) as a starting material. By sintering them simultaneously, there can be obtained an intended composition, that is a composition represented by the above composition formula and having (Sn,Ti)$O_2$, $Mg_2SiO_4$, $MgTi_2O_5$ and $MgSiO_3$ as a main formation phase.

An embodiment of the method for producing the dielectric ceramic composition for high-frequency use according to the invention is as follows. Predetermined amounts of $SnO_2$, $TiO_2$ and $Mg_2SiO_4$ are used as a starting material to be wet-mixed together with a solvent such as alcohol or the like. Then, the solvent is removed and thereafter crushing is carried out. The thus obtained powder is homogeneously mixed with an organic binder like polyvinyl alcohol, and they are dried, crushed and pressure-molded (at a pressure of about 100-1000 kg/cm$^2$). The resulting molded product can be sintered at 1200-1450° C. under an atmosphere of an oxygen-containing gas like air to obtain a dielectric ceramic composition for high-frequency use represented by the above composition formula.

As shown in Examples to be hereinafter described, $SnO_2$ and $TiO_2$ can be used at an equimolar amount. In this case, the formation phase (Sn,Ti)$O_2$ is particularly preferable to be ($Sn_{0.8}Ti_{0.2}$)$O_2$.

The thus obtained dielectric ceramic composition for high-frequency use (including a ceramic form) can be used as a dielectric ceramic electronic component for high-frequency use such as a dielectric resonator or the like, if necessary, by processing to suitable shape and size. In particular, it can be used as a dielectric ceramic electronic component for high-frequency use such as a so-called coaxial type of resonator, a coaxial type of dielectric filter using the same or the like by forming a film or wire composed of a conductive material such as silver, copper or the like in an exterior portion. Moreover, it can be used as a dielectric wiring substrate of dielectric ceramic electronic components for high-frequency use by processing to a plate-like shape and forming a wire of conductive material such as silver, copper or the like. The dielectric ceramic composition for high-frequency use according to the invention in a powder form is mixed with a binder resin such as polyvinyl butyral or the like, a plasticizer such as dibutyl phthalate or the like, and an organic solvent such as toluene or the like, and they are sheet-formed by means of a doctor blade method and so on, and then the resulting sheet is laminated with a conductive sheet and integrally-sintered, whereby it can be also used as a laminated dielectric ceramic electronic component for high-frequency use such as a laminated dielectric filter or the like or a laminated dielectric wiring substrate.

As sources of tin, magnesium, silicon and titanium which are an element constituting the dielectric ceramic composition for high-frequency use according to the invention, there can be used nitrate, carbonate, hydroxide, chloride, an organic metal compound and so on which form an oxidation product during sintering, in addition to $SnO_2$, MgO, $SiO_2$, $TiO_2$ and so on.

The dielectric ceramic for high-frequency use according to the invention comprises a main component consisting of the above-mentioned dielectric composition for high-frequency use. That is to say, the main component is represented by the composition formula of a(Sn,Ti)$O_2$-b$Mg_2SiO_4$-c$MgTi_2O_5$-d$MgSiO_3$ in which a, b, c and d (provided that a, b, c and d are mol %) are within the following ranges: $4 \le a \le 37$, $34 \le b \le 92$, $2 \le c \le 15$ and $2 \le d \le 15$, respectively, and a+b+c+d=100. The dielectric ceramic for high-frequency use according to the invention comprises an adding component consisting of MnO. The adding component is added at an amount of 0.1-5.0 parts by weight based on 100 parts by weight of the main component.

Figure 7:
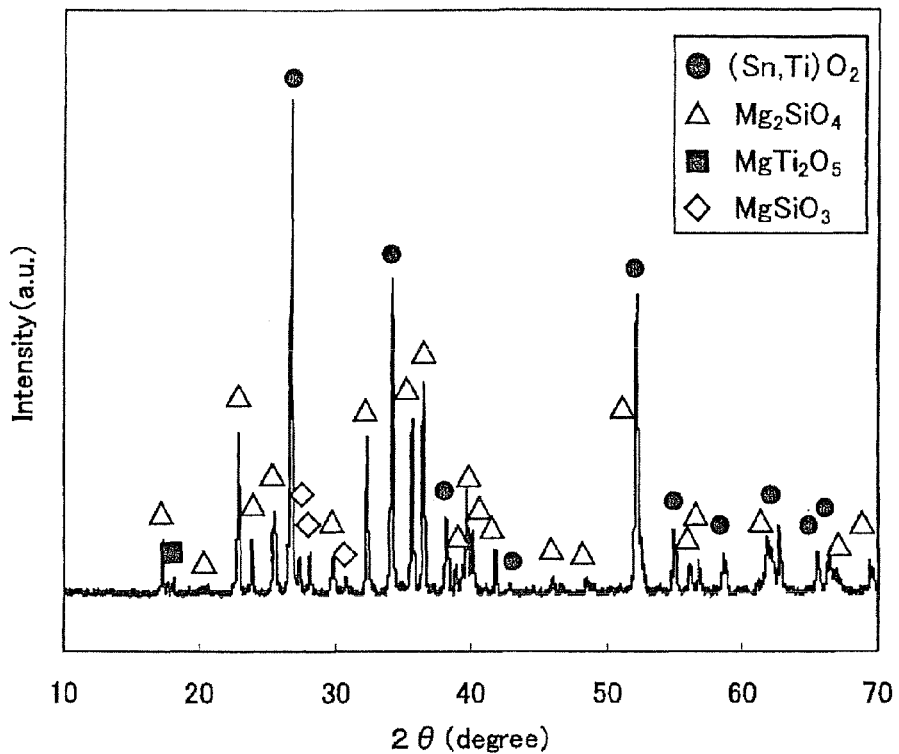
FIG. 7 is an X-ray diffraction graph of the dielectric ceramic for high-frequency use according to the invention.

In the dielectric ceramic for high-frequency use according to the invention, particularly as shown in the X-ray diffraction graph of FIG. 7, tin titanate ((Sn,Ti)O$_2$), forsterite (Mg$_2$SiO$_4$), magnesium titanate (MgTi$_2$O$_5$) and steatite (MgSiO$_3$) are a main formation phase. (Sn$_{0.8}$Ti$_{0.2}$)O$_2$ and (Sn$_{0.2}$Ti$_{0.8}$)O$_2$ are known as the (Sn,Ti)O$_2$. Among them, (Sn$_{0.8}$Ti$_{0.2}$)O$_2$ is characterized by being easier to sinter and control $\tau_f$ than (Sn$_{0.2}$Ti$_{0.8}$)O$_2$. In FIG. 7, only main formation phases are shown, but the adding component MnO is not shown because of trace amounts.

In the dielectric ceramic for high-frequency use according to the invention, Q$_m$×f$_o$ is a high value of not less than 40000 GHz, for example, not less than 50000 GHz and hence it is easy to provide a dielectric ceramic for high-frequency use having a very small dielectric loss and a high-frequency circuit element using the same. The dielectric ceramic for high-frequency use according to the invention has an absolute value of a temperature coefficient $\tau_f$ of resonance frequency of not more than 30 ppm/° C. and hence it is easy to provide a dielectric ceramic for high-frequency use having a low impact on properties due to temperature and a high-frequency circuit element using the same. The dielectric ceramic for high-frequency use according to the invention has a relative permittivity $\in_r$ of 7.5-12.0 and hence it is easy to provide a high-frequency circuit element with both features of improvement of processability and miniaturization.

Figure 3:
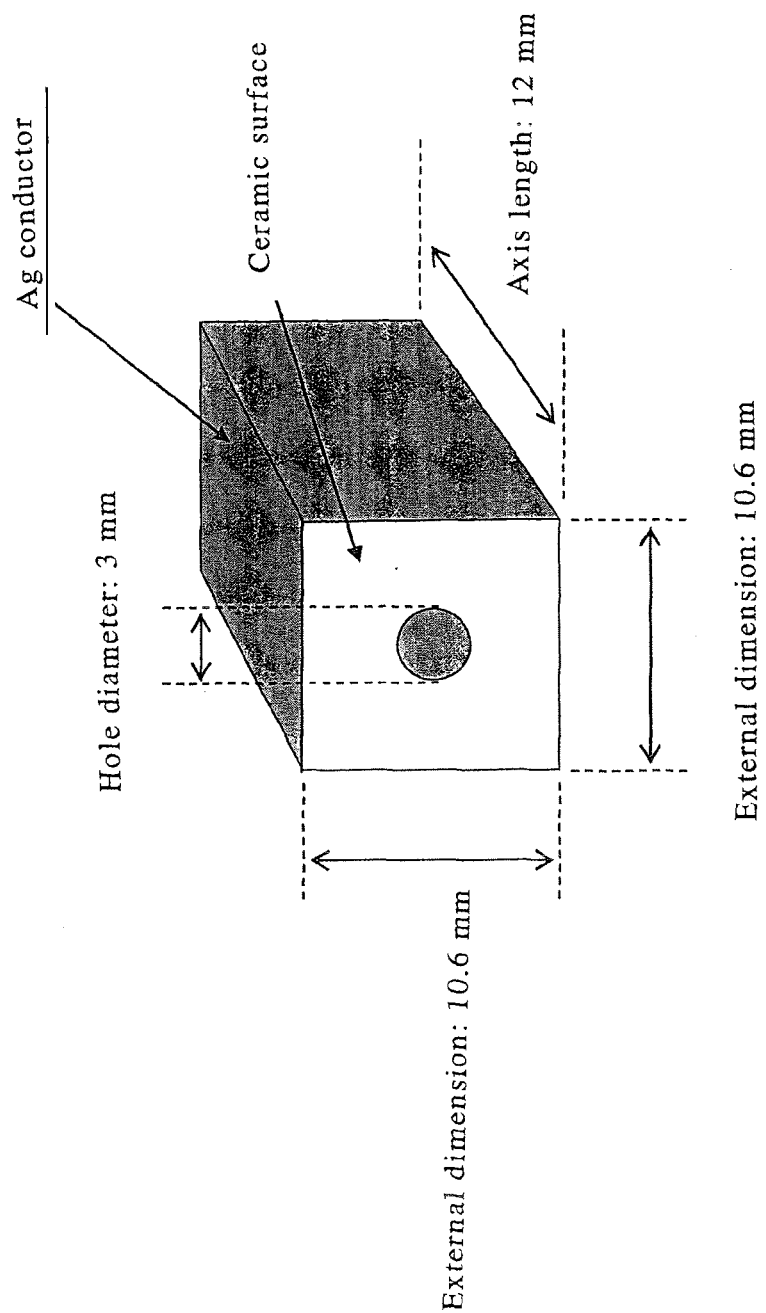
FIG. 3 is a schematic perspective view of a coaxial type of dielectric resonator as an example of the high-frequency circuit element produced by using the dielectric ceramic composition for high-frequency use according to the invention.

The dielectric ceramic for high-frequency use according to the invention has good properties concerning the Q$_m$×f$_o$, $\tau_f$ and $\in_r$, and can be produced at a high yield without reacting with a bottom board composed of zirconia (ZrO$_2$), alumina (Al$_2$O$_3$) or the like which is contacted in sintering during the production, because the amount of the adding component MnO added is 0.1-5.0 parts by weight based on 100 parts by weight of the main component and the relative density is not less than 95%. It is, therefore, easy to provide a high-frequency circuit element. As an example of such a high-frequency circuit element, there is mentioned a coaxial dielectric resonator as shown in FIG. 3, wherein a dielectric ceramic block of an external dimension of 10.6 mm×10.6 mm×12 mm (axis length) is provided with a through-hole in a cylindrical form having a hole diameter of 3 mm along an axis length direction. Only one surface of the block in which the through-hole opens (opened surface) remains the surface of the dielectric ceramic (ceramic surface), while a conductive film composed of a conductive material Ag is formed on other surfaces of the dielectric ceramic and the inner surface of the through-hole.

Reasons for limitation regarding the composition of the dielectric ceramic for high-frequency use according to the invention will be described. In the composition formula of the main component of a(Sn,Ti)O$_2$-bMg$_2$SiO$_4$-cMgTi$_2$O$_5$-dMgSiO$_3$, when a is less than 4, the temperature coefficient $\tau_f$ of resonance frequency is not preferable to be less than −30 ppm/° C. (that is, the absolute value of the temperature coefficient $\tau_f$ is more than 30 ppm/° C.). When a exceeds 37, the relative permittivity $\in_r$ is not preferable to be more than 12.0. The more preferable range of a is 18≤a≤36. When it is within this range, the absolute value of the temperature coefficient $\tau_f$ of resonance frequency is not more than 20 ppm/° C. When b is less than 34, the relative permittivity $\in_r$ is not preferable to be more than 12.0. When b exceeds 92, the temperature coefficient $\tau_f$ of resonance frequency is not preferable to be less than −30 ppm/° C. (that is, the absolute value of the temperature coefficient $\tau_f$ is more than 30 ppm/° C.). The more preferable range of b is 34≤b≤68. When it is within this range, the absolute value of the temperature coefficient $\tau_f$ of resonance frequency is not more than 20 ppm/° C. When c is less than 2, the temperature coefficient $\tau_f$ of resonance frequency is not preferable to be less than −30 ppm/° C. (that is, the absolute value of the temperature coefficient $\tau_f$ is more than 30 ppm/° C.). When c exceeds 15, the relative permittivity $\in_r$ is not preferable to be more than 12.0. When d is less than 2, the temperature coefficient $\tau_f$ of resonance frequency is not preferable to be less than −30 ppm/° C. (that is, the absolute value of the temperature coefficient $\tau_f$ is more than 30 ppm/° C.). When d exceeds 15, the relative permittivity $\in_r$ is not preferable to be more than 12.0.

As shown in Examples to be hereinafter described, it is able to achieve a sufficiently large Q$_m$ value at an absolute value of a temperature coefficient $\tau_f$ of resonance frequency f$_o$ of not more than 30 ppm/° C., that is within a near-zero range of $\tau_f$, but also adjust a relative permittivity $\in_r$ to a desired value of 7.5-12.0 by changing properly molar ratios of a, b, c and d in the composition formula of the main component within the composition range of the dielectric ceramic for high-frequency use according to the invention.

When the amount of the adding component MnO added is less than 0.1 parts by weight based on 100 parts by weight of the main component, it is not preferable to be difficult to achieve a relative density of not less than 95% by sintering at a relatively low temperature of not more than 1300° C., particularly not more than 1250° C. and obtain a good Q$_m$×f$_o$ value. While when the amount of the adding component MnO added exceeds 5.0 parts by weight based on 100 parts by weight of the main component, it is not preferable to be difficult to obtain good Q$_m$×f$_o$ value and $\in_r$ and further to be prone to decrease a production yield by reacting with a bottom board to be contacted in sintering during the production.

An embodiment of the method for producing the dielectric ceramic for high-frequency use according to the invention is as follows. Predetermined amounts of SnO$_2$, TiO$_2$ and Mg$_2$SiO$_4$ are wet-mixed together with a solvent such as alcohol or the like. Then, the solvent is removed and thereafter calcining at 1000-1150° C. and crushing are carried out to obtain a starting material powder.

A predetermined amount of MnO as a sintering aid is added to the starting material powder, and they are wet-mixed together with a solvent such as alcohol or the like. An organic binder like polyvinyl alcohol is added to the powder obtained by removing the solvent, and they are mixed homogeneously, dried and crushed, and thereafter pressure-molded so as to be a molding density of 2.0-2.4 g/cm$^3$, preferably 2.2-2.4 g/cm$^3$. The resulting molded product is sintered at 1200-1300° C. under an atmosphere of an oxygen-containing gas like air, whereby there can be obtained a dielectric ceramic for high-frequency use comprising a main component represented by the above composition formula and an adding component consisting of MnO wherein 0.1-5.0 parts by weight of the adding component is added to 100 parts by weight of the main component and wherein the relative density is not less than 95%.

As shown in Examples to be hereinafter described, SnO$_2$ and TiO$_2$ can be used at an equimolar amount. In this case, the formation phase (Sn,Ti)O$_2$ is particularly preferable to be (Sn$_{0.8}$Ti$_{0.2}$)O$_2$.

The thus obtained dielectric ceramic for high-frequency use can be processed to suitable shape and size as needed.

The dielectric ceramic for high-frequency use according to the invention can be used to constitute a high-frequency circuit element such as a coaxial type of dielectric resonator as shown in FIG. 3, a coaxial type of dielectric filter using the same or the like, for example, by forming a film or wire composed of a conductive material such as silver, copper or the like in an exterior portion. The dielectric ceramic for high-frequency use according to the invention in a plate-like form can be used as a dielectric wiring substrate for various high-frequency circuits by forming a wire of a conductive material such as silver, copper or the like.

A predetermined amount of MnO as a sintering aid is added to the starting material powder, and added with a low-melting-point glass, and thereafter mixed with a binder resin such as polyvinyl butyral or the like, a plasticizer such as dibutyl phthalate or the like and an organic solvent such as toluene or the like, and they are sheet-formed by means of a doctor blade method and so on, and then the resulting sheet is laminated with a conductive sheet and integrally-sintered, whereby there can be obtained a laminated high-frequency circuit element such as a laminated dielectric filter, a laminated dielectric wiring substrate or the like.

As sources of Sn, Mg, Si and Ti which are an element constituting the dielectric ceramic for high-frequency use according to the invention, and MnO, there can be used oxide such as MgO, $SiO_2$ or the like and further nitrate, carbonate, hydroxide, chloride and an organic metal compound which form an oxidation product during sintering, and so on, in addition to $SnO_2$, $TiO_2$, $Mg_2SiO_4$ and MnO.

In the dielectric ceramic for high-frequency use according to the invention, the constitutive element is O, Sn, Mg, Si, Ti and MgO, but Ca, Ba, Zr, Ni, Fe, Cr, P, Na and so on derived from impurities in, for example, a crushed ball or a raw material powder may be incorporated as impurities.

Figure 4:
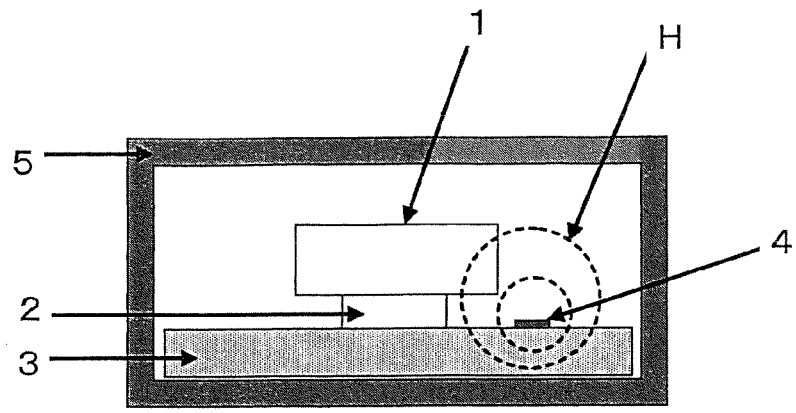
FIG. 4 is a schematic sectional view of a microwave transmitter of a dielectric resonator control type as an example of the high-frequency circuit element.
Figure 5:
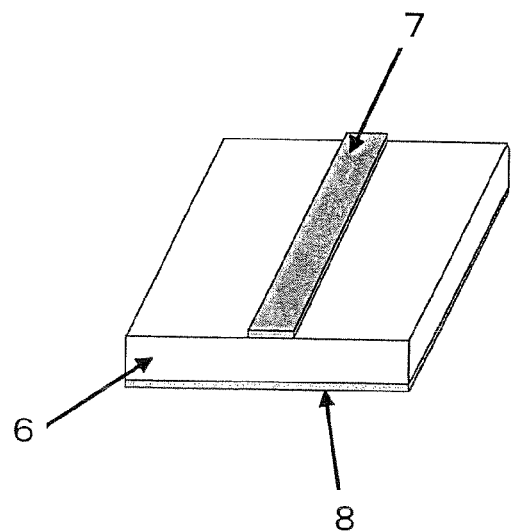
FIG. 5 is a schematic perspective view of a microstrip line as an example of the high-frequency circuit element.

The dielectric ceramic for high-frequency use according to the invention can be used as a constitutive member of various high-frequency circuit elements as long as it is required to have a low dielectric constant and a high $Q_m$ value. As such an example, there is mentioned a constitutive member of a microwave transmitter of a dielectric resonator control type as shown in FIG. 4. In the microwave transmitter, a coaxial dielectric resonator 1 is mounted on a dielectric ceramic substrate 3 through a supporting member 2 composed of a dielectric ceramic, and the coaxial dielectric resonator 1 is coupled to a strip conductor 4 of a microstrip line provided on the dielectric ceramic substrate 3 with an electromagnetical field H which is leaked outside the coaxial dielectric resonator 1. Reference sign 5 is a metal case exercising an electromagnetic shield function. In the microwave transmitter, the dielectric ceramic for high-frequency use according to the invention can be used as the dielectric block of the coaxial dielectric resonator 1 as described with reference to FIG. 3, as the supporting member 2, or as the dielectric ceramic substrate 3. The microstrip line is shown in detail in FIG. 5. In the microstrip line, a strip conductor 7 is provided on the front surface of a dielectric ceramic substrate 6 (corresponding to the dielectric ceramic substrate 3), and a ground conductive film 8 is provided on the back surface of the dielectric ceramic substrate 6. As an example of a material for the strip conductor 7, there are mentioned Pd, Cu, Au and Ag.

Figure 6:
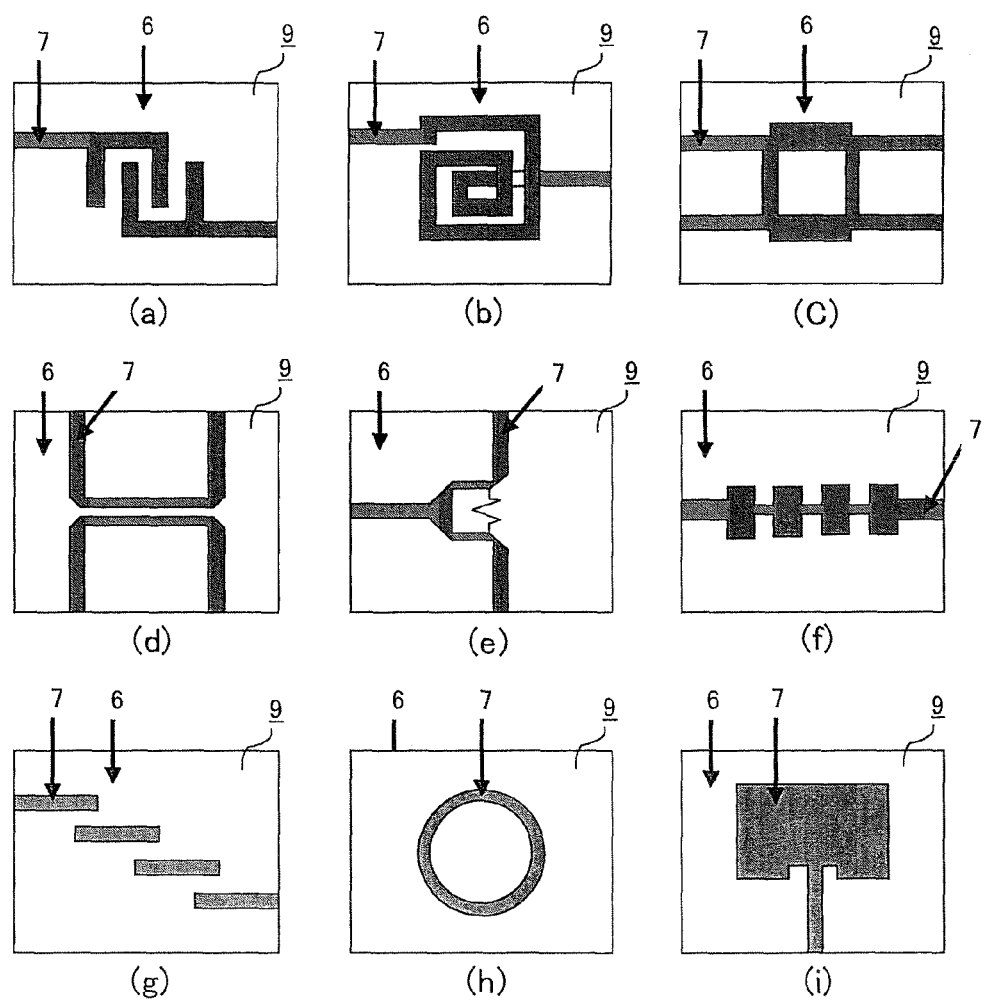
FIG. 6 is a schematic plan view showing patterns of various microstrip lines each constituting a planar type of high-frequency circuit element.

As other examples of a high-frequency circuit element wherein the dielectric ceramic for high-frequency use according to the invention is used as a constitutive member, there are mentioned high-frequency planar circuit elements each shown in (a)-(i) of FIG. 6. In these high-frequency planar circuit elements 9, a strip conductor 7 is provided on the front surface of a dielectric ceramic substrate 6, and a ground conductive film is provided on the back surface of the dielectric ceramic substrate 6 as in the microstrip line. A conductive film of various patterns made of the same material as the strip conductor 7 is formed on the front surface of the dielectric ceramic substrate 6. The function of each element is exercised by the conductive film. In FIG. 6, the element of (a) is an interdigital capacitor, and the element of (b) is a spiral inductor, and the element of (c) is a branch circuit, and the element of (d) is a directional coupler, and the element of (e) is a power distribution/composition device, and the element of (f) is a low pass filter, and the element of (g) is a bandpass filter, and the element of (h) is a ring resonator, and the element of (i) is a patch antenna.

The other dielectric ceramic for high-frequency use according to the invention is comprised of the above-mentioned dielectric composition for high-frequency use. That is to say, it is represented by the composition formula of $a(Sn,Ti)O_2$-$bMg_2SiO_4$-$cMgTi_2O_5$-$dMgSiO_3$ in which a, b, c and d (provided that a, b, c and d are mol %) are within the following ranges: $4 \leq a \leq 37$, $34 \leq b \leq 92$, $2 \leq c \leq 15$ and $2 \leq d \leq 15$, respectively, and $a+b+c+d=100$.

Figure 9:
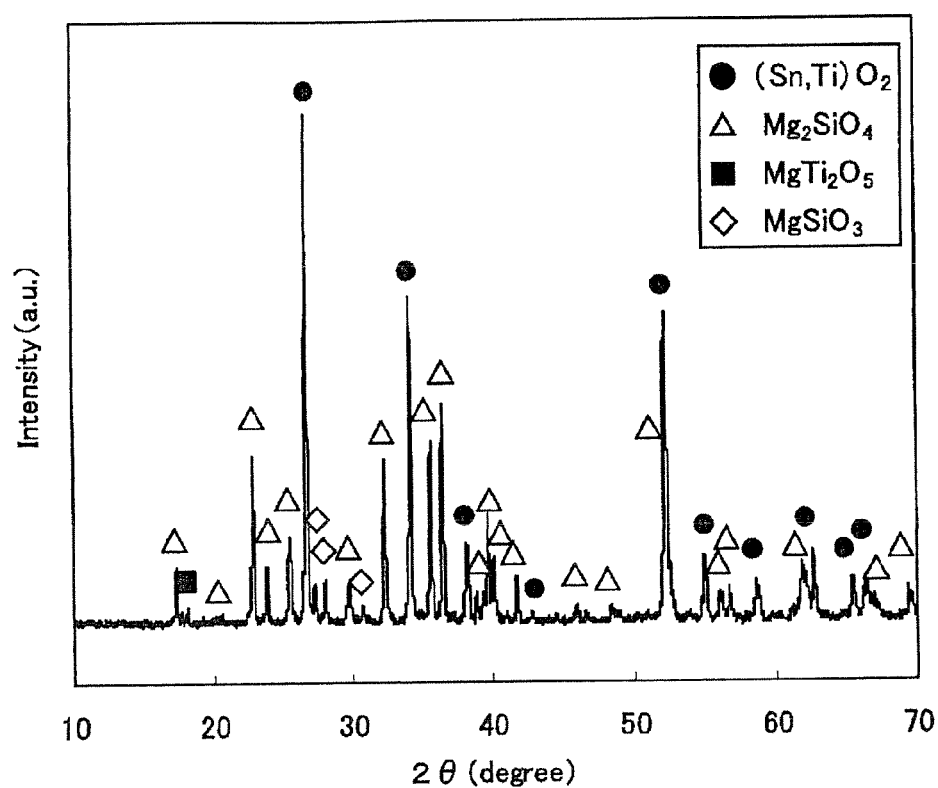
FIG. 9 is an X-ray diffraction graph of the dielectric ceramic for high-frequency use according to the invention.

In the dielectric ceramic for high-frequency use according to the invention, particularly as shown in the X-ray diffraction graph of FIG. 9, tin titanate ($(Sn,Ti)O_2$), forsterite ($Mg_2SiO_4$), magnesium titanate ($MgTi_2O_5$) and steatite ($MgSiO_3$) are a main formation phase. $(Sn_{0.8}Ti_{0.2})O_2$ and $(Sn_{0.2}Ti_{0.8})O_2$ are known as the $(Sn,Ti)O_2$. Among them, $(Sn_{0.8}Ti_{0.2})O_2$ is characterized by being easier to sinter and control $\tau_f$ than $(Sn_{0.2}Ti_{0.8})O_2$.

In the dielectric ceramic for high-frequency use according to the invention, $Q_m \times f_o$ is a high value of not less than 40000 GHz, for example, not less than 50000 GHz and hence it is easy to provide a dielectric ceramic for high-frequency use having a very small dielectric loss and a high-frequency circuit element using the same. The dielectric ceramic for high-frequency use according to the invention has an absolute value of a temperature coefficient $\tau_f$ of resonance frequency of not more than 30 ppm/° C. and hence it is easy to provide a dielectric ceramic for high-frequency use having a low impact on properties due to temperature and a high-frequency circuit element using the same. The dielectric ceramic for high-frequency use according to the invention has a relative permittivity $\in_r$ of 7.5-12.0 and hence it is easy to provide a high-frequency circuit element with both features of improvement of processability and miniaturization.

The dielectric ceramic for high-frequency use according to the invention has a surface arithmetic mean roughness Ra of not more than 2 μm and hence it is easy to provide a high-frequency circuit element which is insusceptible to a skin effect and has a high non-loaded Q value. As an example of such a high-frequency circuit element, there is mentioned a coaxial dielectric resonator as shown in FIG. 3, wherein a dielectric ceramic block having an external dimension of 10.6 mm×10.6 mm×12 mm (axis length) is provided with a through-hole in a cylindrical form having a hole diameter of 3 mm along an axis length direction. Only one surface of the block in which the through-hole opens (opened surface) remains the surface of the dielectric ceramic (ceramic surface), while a conductive film composed of a conductive material Ag is formed on other surfaces of the dielectric ceramic and the inner surface of the through-hole.

Reasons for limitation regarding the composition of the dielectric ceramic for high-frequency use according to the invention will be described. In the composition formula of $a(Sn,Ti)O_2$-$bMg_2SiO_4$-$cMgTi_2O_5$-$dMgSiO_3$, when a is less than 4, the temperature coefficient $\tau_f$ of resonance frequency is not preferable to be less than −30 ppm/° C. (that is, the absolute value of the temperature coefficient $\tau_f$ is more than 30 ppm/° C.). When a exceeds 37, the relative permittivity $\in_r$ is not preferable to be more than 12.0. The more preferable range of a is $18 \leq a \leq 36$. When it is within this range, the absolute value of the temperature coefficient $\tau_f$ of resonance frequency is not more than 20 ppm/° C. When b is less than 34, the relative permittivity $\in_r$ is not preferable to be more than 12.0. When b exceeds 92, the temperature coefficient $\tau_f$ of resonance frequency is not preferable to be less than −30 ppm/° C. (that is, the absolute value of the temperature coefficient $\tau_f$ is more than 30 ppm/° C.). The more preferable range of b is 34≤b≤68. When it is within this range, the absolute value of the temperature coefficient $\tau_f$ of resonance frequency is not more than 20 ppm/° C. When c is less than 2, the temperature coefficient $\tau_f$ of resonance frequency is not preferable to be less than −30 ppm/° C. (that is, the absolute value of the temperature coefficient $\tau_f$ is more than 30 ppm/° C.). When c exceeds 15, the relative permittivity $\in_r$ is not preferable to be more than 12.0. When d is less than 2, the temperature coefficient $\tau_f$ of resonance frequency is not preferable to be less than −30 ppm/° C. (that is, the absolute value of the temperature coefficient $\tau_f$ is more than 30 ppm/° C.). When d exceeds 15, the relative permittivity $\in_r$ is not preferable to be more than 12.0.

As shown in Examples to be hereinafter described, it is able to achieve a sufficiently large $Q_m$ value at an absolute value of a temperature coefficient $\tau_f$ of resonance frequency $f_o$ of not more than 30 ppm/° C., that is within a near-zero range of $\tau_f$, but also adjust a relative permittivity $\in_r$ to a desired value of 7.5-12.0 by changing properly molar ratios of a, b, c and d in the composition formula within the composition range of the dielectric ceramic for high-frequency use according to the invention.

In the high-frequency circuit element comprising a member composed of the dielectric ceramic for high-frequency use, for example, the coaxial dielectric resonator comprising the dielectric ceramic block of 10.6 mm square as shown in FIG. 3, when the surface arithmetic mean roughness Ra of the dielectric ceramic block exceeds 2 μm, it is not preferable to decrease a non-loaded Q value to a large extent, for example, to not more than 1000.

Figure 8:
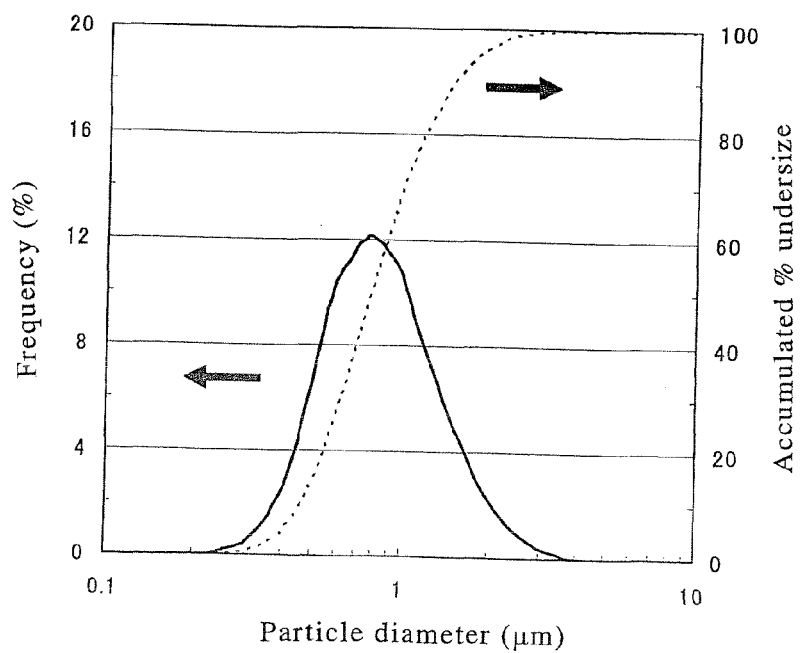
FIG. 8 is a view showing an example of the particle size distribution of a raw mixture used for the production of the dielectric ceramic for high-frequency use according to the invention.

An embodiment of the method for producing the dielectric ceramic for high-frequency use according to the invention is as follows. Predetermined amounts of $SnO_2$, $TiO_2$ and $Mg_2SiO_4$ as a starting material are wet-mixed together with a solvent such as alcohol or the like. Then, the solvent is removed and thereafter crushing is carried out until D50 of particle size distribution becomes not more than 2 μm. An example of the particle size distribution of the resulting powder is shown in FIG. 8. An organic binder like polyvinyl alcohol is added to the thus obtained powder, and they are mixed homogeneously, dried, crushed and pressure-molded (at a pressure of about 100-1000 kg/cm²). The resulting molded product can be sintered at 1200-1450° C. under an atmosphere of an oxygen-containing gas like air to obtain a dielectric ceramic for high-frequency use represented by the above composition formula and having a surface arithmetic mean roughness Ra of not more than 2 μm. When D50 of the particle size distribution after mixing and crushing of the starting material exceeds 2 μm, the surface arithmetic mean roughness Ra of the sintered product easily exceeds 2 μm and thereby the non-loaded Q value of the dielectric ceramic for high-frequency use is prone to be decreased.

As shown in Examples to be hereinafter described, $SnO_2$ and $TiO_2$ can be used at an equimolar amount. In this case, the formation phase $(Sn,Ti)O_2$ is particularly preferable to be $(Sn_{0.8}Ti_{0.2})O_2$.

The thus obtained dielectric ceramic for high-frequency use can be used as a constitutive member for a high-frequency circuit element having good properties without subjecting to a further surface planarization process. Thus, there is provided a high-frequency circuit element with both features of easiness in production and easiness in miniaturization. However, it may be processed to suitable shape and size as needed.

The dielectric ceramic for high-frequency use according to the invention can be used to constitute a high-frequency circuit element such as a coaxial type of dielectric resonator as shown in FIG. 3, a coaxial type of dielectric filter using the same or the like, for example, by forming a film or wire composed of a conductive material such as silver, copper or the like in an exterior portion. The dielectric ceramic for high-frequency use according to the invention in a plate-like form can be used as a dielectric wiring substrate for various high-frequency circuits by forming a wire of a conductive material such as silver, copper or the like.

As sources of Sn, Mg Si and Ti which are an element constituting the dielectric ceramic for high-frequency use according to the invention, there can be used oxide such as MgO, $SiO_2$ or the like and further nitrate, carbonate, hydroxide, chloride and an organic metal compound which form an oxidation product during sintering, and so on, in addition to $SnO_2$, $TiO_2$ and $Mg_2SiO_4$.

In the dielectric ceramic for high-frequency use according to the invention, the constitutive element is O, Sn, Mg, Si and Ti, but Ca, Ba, Zr, Ni, Fe, Cr, P, Na and so on derived from impurities in, for example, a crushed ball or a raw material powder may be incorporated as impurities.

The dielectric ceramic for high-frequency use according to the invention can be used as a constitutive member of various high-frequency circuit elements as long as it is required to have a low dielectric constant and a high $Q_m$ value. As such an example, there is mentioned a constitutive member of the above-mentioned microwave transmitter of a dielectric resonator control type as shown in FIG. 4. As other examples of a high-frequency circuit element wherein the dielectric ceramic for high-frequency use according to the invention is used as a constitutive member, there are mentioned the above high-frequency planar circuit elements each shown in (a)-(i) of FIG. 6.

EXAMPLES

The invention is further illustrated by the following Examples and Comparative Examples.

Example 1

First Invention

Predetermined amounts of $SnO_2$, $TiO_2$ and $Mg_2SiO_4$ are weighed so that $SnO_2$ is 4.8 mol %, $TiO_2$ is 4.8 mol % and $Mg_2SiO_4$ is 90.5 mol % (see Table 1), and then they are put into a ball mill together with ethanol and a $ZrO_2$ ball and wet-mixed for 12 hours. Then, the solvent is removed from the solution, and thereafter crushing is carried out. An appropriate amount of a polyvinyl alcohol (PVA) solution is added to the crushed product, and they are dried and thereafter formed into a pellet of 20 mm in diameter and 10 mm in thickness and sintered at 1300° C. for 2 hours under air atmosphere.

The resulting dielectric ceramic composition for high-frequency use (see Table 1) is processed to a size of 16 mm in diameter and 8 mm in thickness and then the $Q \times f_o$ value (i.e. $Q_m \times f_o$ value) relative permittivity $\in_r$ and temperature coefficient $\tau_f$ of resonance frequency at a resonance frequency of 5-12 GHz are calculated by measuring with a dielectric resonance method. The results are shown in Table 1.

With respect to the resulting dielectric ceramic composition for high-frequency use, the X-ray diffraction is analyzed and as a result, it is confirmed that it consists of crystal phases of tin titanate (($Sn_{0.8}Ti_{0.2}$)$O_2$), forsterite ($Mg_2SiO_4$), magnesium titanate ($MgTi_2O_5$) and steatite ($MgSiO_3$) as shown in FIG. 1.

Figure 2:
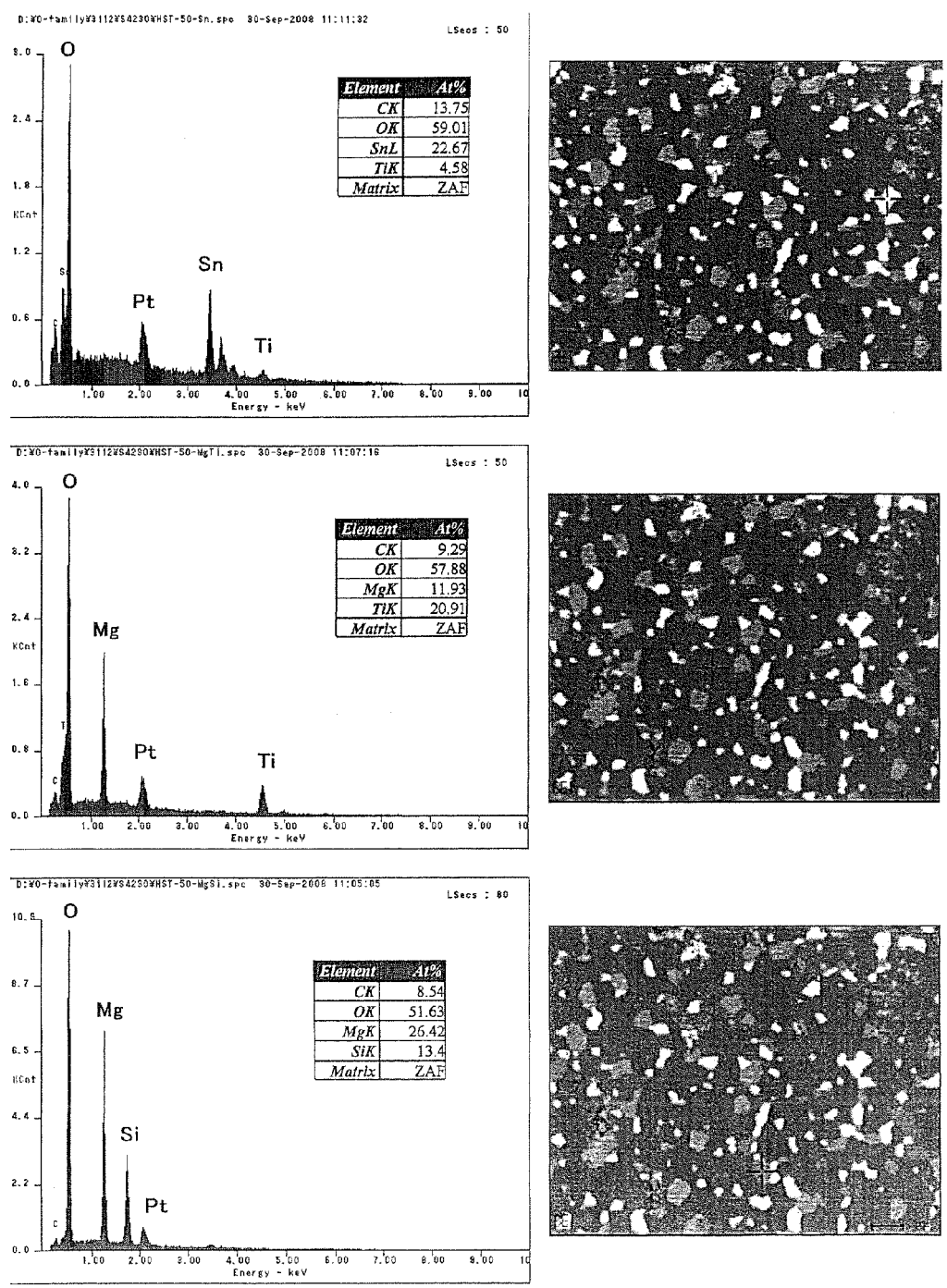
FIG. 2 is an EDS analysis view of the dielectric ceramic composition for high-frequency use according to the invention.

With respect to the resulting dielectric ceramic composition for high-frequency use, the surface composition is analyzed with Energy-Dispersive X-ray Spectroscopy [EDS] and as a result, crystal phases of tin titanate (($Sn_{0.8}Ti_{0.2}$)$O_2$), forsterite ($Mg_2SiO_4$) and magnesium titanate ($MgTi_2O_5$) are confirmed. The results of analysis are shown in FIG. 2.

2.75 wt % of PVA, 1 wt % of Serozole and 1 wt % of a dispersant are added to 100 wt % of the dielectric ceramic composition for high-frequency use to produce spray granules. The spray granules are used to be molded so that the green density is 2.1 g/cm$^3$, and thereafter sintered under an air atmosphere condition of 1300° C.×2 hours. The sintered product has a hole (through-hole). Only one surface in which the hole opens (opened surface) is kept as it is, while an Ag film electrode is formed on other surfaces, and hence a coaxial type of dielectric resonator is produced as a dielectric ceramic electronic component for high-frequency use as shown in FIG. 3. The coaxial type of resonator has a size of 12 mm in axis length, 10.6 mm in external dimension (one side length of opened surface having an approximate rectangular shape) and 3 mm in hole diameter.

With respect to the resulting coaxial type of resonator, the non-loaded Q value at a resonance frequency of 2 GHz is evaluated. As a result, the non-loaded Q value of the coaxial type of resonator is 1302. Thus, a coaxial type of resonator having excellent high-frequency properties is obtained by using the dielectric ceramic composition for high-frequency use according to the invention.

Examples 2-12

First Invention

Predetermined amounts of $SnO_2$, $TiO_2$ and $Mg_2SiO_4$ are weighed so as to be a compounding amount as shown in Table 1, and then mixing, crushing, molding and so on are carried out under the same condition as in Example 1 and sintering is carried out at a temperature of 1200-1350° C. for 2 hours under air atmosphere to produce a dielectric ceramic composition for high-frequency use. The properties thereof are evaluated in the same manner as in Example 1. The results are shown in Table 1.

Comparative Examples 1-5

First Invention

Predetermined amounts of $SnO_2$, $TiO_2$ and $Mg_2SiO_4$ are weighed so as to be a compounding amount as shown in Table 2, and then mixing, crushing, molding and so on are carried out under the same condition as in Example 1 and sintering is carried out at a temperature of 1200-1350° C. for 2 hours under air atmosphere to produce a dielectric ceramic composition. The properties thereof are evaluated in the same manner as in Example 1. The results are shown in Table 2.

TABLE 1

| | mol % | | | a | b | c | d | | $Q \times f_o$ | $\tau f$ |
|---|---|---|---|---|---|---|---|---|---|---|
| | $SnO_2$ | $TiO_2$ | $Mg_2SiO_4$ | $(Sn,Ti)O_2$ | $Mg_2SiO_4$ | $MgTi_2O_5$ | $MgSiO_3$ | $\epsilon r$ | GHz | ppm/° C. |
| Example 1 | 4.8 | 4.8 | 90.5 | 4.9 | 91.2 | 2.0 | 2.0 | 7.5 | 50052 | −30 |
| Example 2 | 9.8 | 9.8 | 80.4 | 10.4 | 81.2 | 4.2 | 4.2 | 8.4 | 50768 | −28 |
| Example 3 | 9.8 | 9.8 | 80.4 | 10.4 | 81.2 | 4.2 | 4.2 | 8.6 | 77296 | −30 |
| Example 4 | 11.7 | 11.7 | 76.6 | 12.6 | 77.4 | 5.0 | 5.0 | 8.4 | 50768 | −28 |
| Example 5 | 13.4 | 13.4 | 73.2 | 14.6 | 73.8 | 5.8 | 5.8 | 8.9 | 71872 | −27 |
| Example 6 | 16.4 | 16.4 | 67.2 | 18.2 | 67.3 | 7.3 | 7.3 | 9.6 | 56261 | −18 |
| Example 7 | 18.9 | 18.9 | 62.1 | 21.4 | 61.5 | 8.6 | 8.6 | 10.4 | 74844 | −4 |
| Example 8 | 19.0 | 19.0 | 62.1 | 21.4 | 61.5 | 8.6 | 8.6 | 9.5 | 53000 | −15 |
| Example 9 | 21.1 | 21.1 | 57.7 | 24.2 | 56.4 | 9.7 | 9.7 | 11.0 | 62252 | 8 |
| Example 10 | 24.7 | 24.7 | 50.6 | 29.0 | 47.8 | 11.6 | 11.6 | 10.9 | 50286 | −3 |
| Example 11 | 27.5 | 27.5 | 45.0 | 32.9 | 40.8 | 13.2 | 13.2 | 10.9 | 50118 | 10 |
| Example 12 | 29.7 | 29.7 | 40.5 | 36.2 | 34.9 | 14.5 | 14.5 | 11.2 | 50002 | 15 |

TABLE 2

| | mol % | | | a | b | c | d | | $Q \times f_o$ | $\tau f$ |
|---|---|---|---|---|---|---|---|---|---|---|
| | $SnO_2$ | $TiO_2$ | $Mg_2SiO_4$ | $(Sn,Ti)O_2$ | $Mg_2SiO_4$ | $MgTi_2O_5$ | $MgSiO_3$ | $\epsilon r$ | GHz | ppm/° C. |
| Comparative Example 1 | 0.0 | 0.0 | 100.0 | 0.0 | 100.0 | 0.0 | 0.0 | 7.3 | 80378 | −68 |
| Comparative Example 2 | 1.2 | 1.2 | 97.6 | 1.2 | 97.8 | 0.5 | 0.5 | 7.2 | 76219 | −60 |
| Comparative Example 3 | 2.0 | 2.0 | 96.1 | 2.0 | 96.4 | 0.8 | 0.8 | 7.1 | 31000 | −40 |
| Comparative Example 4 | 31.1 | 31.1 | 37.8 | 38.3 | 31.1 | 15.3 | 15.3 | 13.5 | 33530 | 37 |
| Comparative Example 5 | 33.1 | 33.1 | 33.9 | 41.2 | 25.8 | 16.5 | 16.5 | 15.0 | 32897 | 59 |

Example 13

Second Invention

Predetermined amounts of $SnO_2$, $TiO_2$ and $Mg_2SiO_4$ are weighed so that $SnO_2$ is 4.8 mol %, $TiO_2$ is 4.8 mol % and $Mg_2SiO_4$ is 90.5 mol % (see Table 3), and then they are put into a ball mill together with ethanol and a $ZrO_2$ ball and wet-mixed for 12 hours. Then, the solvent is removed from the solution, and thereafter calcining at 1100° C. for 2 hours and then crushing are carried out. The calcined powder is used as a starting material, and 0.5 parts by weight of MnO is added to 100 parts by weight of the calcined powder, and they are put into a ball mill together with ethanol and a $ZrO_2$ ball and wet-mixed for 12 hours. Then, the solvent is removed from the solution, to which an appropriate amount of a polyvinyl alcohol (PVA) solution is added and dried, and thereafter a pellet of 20 mm in diameter and 8.2 mm in thickness is molded and sintered at 1250° C. for 2 hours under air atmosphere.

With respect to the resulting dielectric ceramic for high-frequency use (see Table 3), the relative density is measured by means of an Archimedes method and as a result, it is 96%.

Further, the dielectric ceramic for high-frequency use is processed to a size of 16.7 mm in diameter and 7.8 mm in thickness and then the Qf value (i.e. $Q_m \times f_o$ value), relative permittivity $\in_r$ and temperature coefficient $\tau_f$ of resonance frequency at a resonance frequency of 5.9-6.5 GHz are calculated by measuring with a dielectric resonance method. The results are shown in Table 3.

With respect to the resulting dielectric ceramic for high-frequency use, the X-ray diffraction is analyzed and as a result, it is confirmed that the main formation phase consists of crystal phases of tin titanate (($Sn_{0.8}Ti_{0.2})O_2$), forsterite ($Mg_2SiO_4$), magnesium titanate ($MgTi_2O_5$) and steatite ($MgSiO_3$) as shown in FIG. 7. Moreover, the fluorescent X-ray analysis is carried out for the resulting dielectric ceramic for high-frequency use and as a result, the presence of MnO is confirmed.

On the other hand, 0.5 parts by weight of MnO as a sintering aid is added to 100 parts by weight of the above starting material powder, and further added with 2.75 parts by weight of PVA, 1 part by weight of Serozole and 1 part by weight of a dispersant to produce spray granules. The spray granules are used to be molded so that the green density is 2.3 g/cm³, and thereafter sintered under an air atmosphere condition of 1250° C.×2 hours. The thus obtained dielectric ceramic for high-frequency use is used as a constitutive member to produce a coaxial dielectric resonator as shown in FIG. 3. The coaxial dielectric resonator has a size of 12 mm in axis length, 10.6 mm in external dimension (one side length of opened surface having an approximate rectangular shape) and 3 mm in hole diameter.

With respect to the resulting coaxial dielectric resonator, the non-loaded Q value at a resonance frequency of 2 GHz is evaluated. As a result, the non-loaded Q value of the coaxial dielectric resonator is 1320. Thus, a coaxial dielectric resonator having excellent high-frequency properties is obtained by using the dielectric ceramic for high-frequency use according to the invention.

Examples 14-25

Second Invention

Predetermined amounts of $SnO_2$, $TiO_2$ and $Mg_2SiO_4$ are weighed so as to be a compounding ratio as shown in Table 3, and then mixing, calcining and crushing are carried out under the same condition as in Example 13. The resulting calcined powder is used as a starting material, and a predetermined amount of MnO is weighed so as to be a compounding amount as shown in Table 3, and they are mixed, and then the adding of a binder, molding and so on are carried out in the same manner as in Example 13, and sintering is carried out at a temperature of 1225-1300° C. as shown in Table 3 for 2 hours under air atmosphere to produce a dielectric ceramic for high-frequency use. The properties thereof are evaluated in the same manner as in Example 13. The results are shown in Table 3. In Table 3 and the after-mentioned Table 4, the column of "Condition" shows a condition as to whether or not a signature formed by reacting with a bottom board to be contacted in sintering during the production is visually confirmed, and the description of "Good" means that no signature formed by reacting with a bottom board is visually confirmed, and the description of "Reacted with bottom board" means that a signature formed by reacting with a bottom board is visually confirmed.

Comparative Examples 6-17

Second Invention

Predetermined amounts of $SnO_2$, $TiO_2$ and $Mg_2SiO_4$ are weighed so as to be a compounding ratio as shown in Table 4, and then mixing, calcining and crushing are carried out under the same condition as in Example 13. The resulting calcined powder is used as a starting material, and a predetermined amount of MnO is weighed so as to be a compounding amount as shown in Table 4, and they are mixed, and then the adding of a binder and molding are carried out in the same manner as in Example 13, and sintering is carried out at a temperature of 1225-1300° C. as shown in Table 4 for 2 hours under air atmosphere to produce a dielectric ceramic for high-frequency use. The properties thereof are evaluated in the same manner as in Example 13. The results are shown in Table 4. At this moment, Comparative Example 13 corresponds to Example of the first invention.

TABLE 3

|  | mol % | | | mol % | | | | MnO |
|---|---|---|---|---|---|---|---|---|
|  | | | | a | b | c | d | Added amount |
|  | $SnO_2$ | $TiO_2$ | $Mg_2SiO_4$ | $(Sn,Ti)O_2$ | $Mg_2SiO_4$ | $MgTi_2O_5$ | $MgSiO_3$ | Parts by weight |
| Example 13 | 4.8 | 4.8 | 90.4 | 4.9 | 91.2 | 2.0 | 2.0 | 0.5 |
| Example 14 | 9.8 | 9.8 | 80.4 | 10.4 | 81.2 | 4.2 | 4.2 | 0.5 |
| Example 15 | 11.7 | 11.7 | 76.6 | 12.6 | 77.4 | 5.0 | 5.0 | 1.0 |
| Example 16 | 13.4 | 13.4 | 73.2 | 14.6 | 73.8 | 5.8 | 5.8 | 1.0 |
| Example 17 | 16.4 | 16.4 | 67.2 | 18.2 | 67.3 | 7.3 | 7.3 | 1.0 |
| Example 18 | 18.9 | 18.9 | 62.2 | 21.4 | 61.5 | 8.6 | 8.6 | 1.0 |

TABLE 3-continued

| | | | | | | | | |
|---|---|---|---|---|---|---|---|---|
| Example 19 | 19.0 | 19.0 | 62.0 | 21.4 | 61.5 | 8.6 | 8.6 | 1.0 |
| Example 20 | 21.1 | 21.1 | 57.8 | 24.2 | 56.4 | 9.7 | 9.7 | 1.0 |
| Example 21 | 24.7 | 24.7 | 50.6 | 29.0 | 47.8 | 11.6 | 11.6 | 2.0 |
| Example 22 | 27.5 | 27.5 | 45.0 | 32.9 | 40.8 | 13.2 | 13.2 | 2.0 |
| Example 23 | 29.7 | 29.7 | 40.6 | 36.2 | 34.9 | 14.5 | 14.5 | 5.0 |
| Example 24 | 29.7 | 29.7 | 40.6 | 36.2 | 34.9 | 14.5 | 14.5 | 5.0 |
| Example 25 | 29.7 | 29.7 | 40.6 | 36.2 | 34.9 | 14.5 | 14.5 | 5.0 |

| | $\epsilon_r$ | Qf value | τf ppm/°C. | Sintering temperature °C. | Relative density % | Condition |
|---|---|---|---|---|---|---|
| Example 13 | 7.5 | 56100 | −28 | 1250 | 96 | Good |
| Example 14 | 8.4 | 53720 | −26 | 1250 | 96 | Good |
| Example 15 | 8.4 | 58770 | −24 | 1250 | 97 | Good |
| Example 16 | 8.9 | 69830 | −24 | 1250 | 97 | Good |
| Example 17 | 9.6 | 59650 | −16 | 1250 | 98 | Good |
| Example 18 | 10.4 | 69800 | −15 | 1250 | 97 | Good |
| Example 19 | 9.5 | 53000 | −15 | 1250 | 97 | Good |
| Example 20 | 11.0 | 62250 | 10 | 1250 | 98 | Good |
| Example 21 | 10.9 | 56920 | 12 | 1250 | 99 | Good |
| Example 22 | 10.9 | 54920 | 15 | 1250 | 98 | Good |
| Example 23 | 11.2 | 50000 | 14 | 1225 | 95 | Good |
| Example 24 | 11.2 | 53400 | 17 | 1250 | 96 | Good |
| Example 25 | 11.2 | 54500 | 18 | 1300 | 98 | Good |

TABLE 4

| | mol % | | | mol % | | | | MnO |
|---|---|---|---|---|---|---|---|---|
| | $SnO_2$ | $TiO_2$ | $Mg_2SiO_4$ | a $(Sn,Ti)O_2$ | b $Mg_2SiO_4$ | c $MgTi_2O_5$ | d $MgSiO_3$ | Added amount Parts by weight |
| Comparative Example 6 | 0.0 | 0.0 | 100.0 | 0.0 | 100.0 | 0.0 | 0.0 | 0.1 |
| Comparative Example 7 | 1.2 | 1.2 | 97.6 | 1.2 | 97.8 | 0.5 | 0.5 | 0.1 |
| Comparative Example 8 | 2.0 | 2.0 | 96.1 | 2.0 | 96.4 | 0.8 | 0.8 | 0.1 |
| Comparative Example 9 | 31.1 | 31.1 | 37.8 | 38.3 | 31.1 | 15.3 | 15.3 | 0.1 |
| Comparative Example 10 | 33.1 | 33.1 | 33.9 | 41.2 | 25.8 | 16.5 | 16.5 | 0.1 |
| Comparative Example 11 | 18.9 | 18.9 | 62.2 | 21.4 | 61.5 | 8.6 | 8.6 | 0.1 |
| Comparative Example 12 | 18.9 | 18.9 | 62.2 | 21.4 | 61.5 | 8.6 | 8.6 | 0.1 |
| Comparative Example 13 | 29.7 | 29.7 | 40.6 | 36.2 | 34.9 | 14.5 | 14.5 | 0.0 |
| Comparative Example 14 | 29.7 | 29.7 | 40.6 | 36.2 | 34.9 | 14.5 | 14.5 | 7.0 |
| Comparative Example 15 | 29.7 | 29.7 | 40.6 | 36.2 | 34.9 | 14.5 | 14.5 | 7.0 |
| Comparative Example 16 | 29.7 | 29.7 | 40.6 | 36.2 | 34.9 | 14.5 | 14.5 | 7.0 |
| Comparative Example 17 | 29.7 | 29.7 | 40.6 | 36.2 | 34.9 | 14.5 | 14.5 | 10.0 |

| | $\epsilon_r$ | Qf value | τf ppm/°C. | Sintering temperature °C. | Relative density % | Condition |
|---|---|---|---|---|---|---|
| Comparative Example 6 | 7.3 | 80380 | −68 | 1250 | 99 | Good |
| Comparative Example 7 | 7.2 | 76220 | −60 | 1250 | 99 | Good |
| Comparative Example 8 | 7.1 | 61000 | −40 | 1250 | 98 | Good |
| Comparative Example 9 | 13.5 | 33530 | 37 | 1250 | 97 | Good |
| Comparative Example 10 | 15.0 | 32900 | 59 | 1250 | 97 | Good |
| Comparative Example 11 | 8.4 | 20430 | −25 | 1200 | 91 | Good |
| Comparative Example 12 | 9.4 | 32500 | −20 | 1225 | 94 | Good |
| Comparative Example 13 | 9.0 | 40300 | 10 | 1225 | 94 | Good |
| Comparative Example 14 | 12.5 | 30020 | 20 | 1225 | 97 | Good |
| Comparative Example 15 | 12.5 | 28700 | 23 | 1250 | 95 | Reacted with bottom board |
| Comparative Example 16 | 12.5 | 26540 | 28 | 1300 | 94 | Reacted with bottom board |
| Comparative Example 17 | 17.0 | 21200 | 40 | 1225 | 97 | Reacted with bottom board |

Example 26

Third Invention

Predetermined amounts of $SnO_2$, $TiO_2$ and $Mg_2SiO_4$ are weighed so that $SnO_2$ is 4.8 mol %, $TiO_2$ is 4.8 mol % and $Mg_2SiO_4$ is 90.5 mol % (see Table 5), and then they are put into a ball mill together with ethanol and a $ZrO_2$ ball and wet-mixed for 12 hours. Then, the solvent is removed from the solution, and thereafter crushing is carried out. The particle size distribution of powders obtained by the crushing is as shown in FIG. 8 (D50 is shown in Table 5). An appropriate amount of a polyvinyl alcohol (PVA) solution is added to the powder and they are dried, and thereafter a pellet of 10 mm in diameter and 3.5 mm in thickness is molded and sintered at 1300° C. for 2 hours under air atmosphere.

The thus obtained dielectric ceramic for high-frequency use (as to the formation phase, see Table 5) is processed to a size of 9.6 mm in diameter and 3.3 mm in thickness and then the $Q_m \times f_o$ value, relative permittivity $\epsilon_r$ and temperature coefficient $\tau_f$ of resonance frequency at a resonance frequency of 5.9-6.5 GHz are calculated by measuring with a dielectric resonance method. The results are shown in Table 5.

At this moment, the surface arithmetic mean roughness Ra of the dielectric ceramic for high-frequency use obtained by the sintering is measured. The result is shown in Table 5.

With respect to the resulting dielectric ceramic for high-frequency use, the X-ray diffraction is analyzed and as a result, it is confirmed that it consists of crystal phases of tin titanate ($(Sn_{0.8}Ti_{0.2})O_2$), forsterite ($Mg_2SiO_4$), magnesium titanate ($MgTi_2O_5$) and steatite ($MgSiO_3$) as shown in FIG. 9.

On the other hand, 2.75 wt % of PVA, 1 wt % of Serozole and 1 wt % of a dispersant are added to 100 wt % of the powder obtained by the crushing to produce spray granules. The spray granules are used to be molded so that the green density is 2.1 $g/cm^3$, and thereafter sintered under an air atmosphere condition of 1300° C.×2 hours. The thus obtained dielectric ceramic for high-frequency use is used as a constitutive member to produce a coaxial dielectric resonator as shown in FIG. 3. The coaxial dielectric resonator has a size of 12 mm in axis length, 10.6 mm in external dimension (one side length of opened surface having an approximate rectangular shape) and 3 mm in hole diameter.

With respect to the resulting coaxial dielectric resonator, the non-loaded Q value at a resonance frequency of 2 GHz is evaluated. As a result, the non-loaded Q value of the coaxial dielectric resonator is 1360. Thus, a coaxial dielectric resonator having excellent high-frequency properties is obtained by using the dielectric ceramic for high-frequency use according to the invention.

Examples 27-36

Third Invention

Predetermined amounts of $SnO_2$, $TiO_2$ and $Mg_2SiO_4$ are weighed so as to be a compounding ratio as shown in Table 5, and then mixing, crushing, molding and so on are carried out under the same condition as in Example 26 and sintering is carried out at a temperature of 1200-1350° C. for 2 hours under air atmosphere to produce a dielectric ceramic for high-frequency use. The properties thereof are evaluated in the same manner as in Example 26. The results are shown in Table 5.

Comparative Examples 18-24

Third Invention

Predetermined amounts of $SnO_2$, $TiO_2$ and $Mg_2SiO_4$ are weighed so as to be a compounding ratio as shown in Table 6, and then mixing, crushing, molding and so on are carried out under the same condition as in Example 26 and sintering is carried out at a temperature of 1200-1350° C. for 2 hours under air atmosphere to produce a dielectric ceramic for high-frequency use. The properties thereof are evaluated in the same manner as in Example 26. The results are shown in Table 6. At this moment, Comparative Examples 21 and 22 correspond to Example of the first invention.

TABLE 5

| | mol % | | | a | b | c | d | | Qm × f0 value | τf |
|---|---|---|---|---|---|---|---|---|---|---|
| | $SnO_2$ | $TiO_2$ | $Mg_2SiO_4$ | $(Sn,Ti)O_2$ | $Mg_2SiO_4$ | $MgTi_2O_5$ | $MgSiO_3$ | εr | GHz | ppm/° C. |
| Example 26 | 4.8 | 4.8 | 90.4 | 4.9 | 91.2 | 2.0 | 2.0 | 7.5 | 50052 | −30 |
| Example 27 | 9.8 | 9.8 | 80.4 | 10.4 | 81.2 | 4.2 | 4.2 | 8.4 | 50768 | −28 |
| Example 28 | 11.7 | 11.7 | 76.6 | 12.6 | 77.4 | 5.0 | 5.0 | 8.4 | 50768 | −28 |
| Example 29 | 13.4 | 13.4 | 73.2 | 14.6 | 73.8 | 5.8 | 5.8 | 8.9 | 71872 | −27 |
| Example 30 | 16.4 | 16.4 | 67.2 | 18.2 | 67.3 | 7.3 | 7.3 | 9.6 | 56261 | −18 |
| Example 31 | 18.9 | 18.9 | 62.2 | 21.4 | 61.5 | 8.6 | 8.6 | 10.4 | 74844 | −4 |
| Example 32 | 19.0 | 19.0 | 62.0 | 21.4 | 61.5 | 8.6 | 8.6 | 9.5 | 53000 | −15 |
| Example 33 | 21.1 | 21.1 | 57.8 | 24.2 | 56.4 | 9.7 | 9.7 | 11.0 | 62252 | 8 |
| Example 34 | 24.7 | 24.7 | 50.6 | 29.0 | 47.8 | 11.6 | 11.6 | 10.9 | 50286 | −3 |
| Example 35 | 27.5 | 27.5 | 45.0 | 32.9 | 40.8 | 13.2 | 13.2 | 10.9 | 50118 | 10 |
| Example 36 | 29.7 | 29.7 | 40.6 | 36.2 | 34.9 | 14.5 | 14.5 | 11.2 | 50002 | 15 |

| | D50 μm | Arithmetic mean roughness Ra μm | 10.6 mm □ Coaxial resonator Non-loaded Q |
|---|---|---|---|
| Example 26 | 1.2 | 0.8 | 1360 |
| Example 27 | 1.1 | 0.8 | 1300 |
| Example 28 | 1.3 | 0.9 | 1290 |
| Example 29 | 1.3 | 0.9 | 1300 |
| Example 30 | 1.4 | 1.0 | 1280 |
| Example 31 | 1.4 | 1.0 | 1300 |
| Example 32 | 1.5 | 1.1 | 1260 |
| Example 33 | 1.5 | 1.3 | 1240 |
| Example 34 | 1.5 | 1.4 | 1180 |
| Example 35 | 1.8 | 1.6 | 1150 |
| Example 36 | 1.8 | 1.8 | 1100 |

TABLE 6

| | mol % | | | a | b | c | d | | Qm × f0 value | τf |
|---|---|---|---|---|---|---|---|---|---|---|
| | $SnO_2$ | $TiO_2$ | $Mg_2SiO_4$ | $(Sn,Ti)O_2$ | $Mg_2SiO_4$ | $MgTi_2O_5$ | $MgSiO_3$ | εr | GHz | ppm/° C. |
| Comparative Example 18 | 0.0 | 0.0 | 100.0 | 0.0 | 100.0 | 0.0 | 0.0 | 7.3 | 80378 | −68 |
| Comparative Example 19 | 1.2 | 1.2 | 97.6 | 1.2 | 97.8 | 0.5 | 0.5 | 7.2 | 76219 | −60 |

TABLE 6-continued

| | | | | | | | | | | |
|---|---|---|---|---|---|---|---|---|---|---|
| Comparative Example 20 | 2.0 | 2.0 | 96.1 | 2.0 | 96.4 | 0.8 | 0.8 | 7.1 | 31000 | −40 |
| Comparative Example 21 | 18.9 | 18.9 | 62.2 | 21.4 | 61.5 | 8.6 | 8.6 | 10.4 | 74844 | −4 |
| Comparative Example 22 | 18.9 | 18.9 | 62.2 | 21.4 | 61.5 | 8.6 | 8.6 | 10.4 | 74844 | −4 |
| Comparative Example 23 | 31.1 | 31.1 | 37.8 | 38.3 | 31.1 | 15.3 | 15.3 | 13.5 | 33530 | 37 |
| Comparative Example 24 | 33.1 | 33.1 | 33.9 | 41.2 | 25.8 | 16.5 | 16.5 | 15.0 | 32897 | 59 |

| | D50 μm | Arithmetic mean roughness Ra μm | 10.6 mm □ Coaxial resonator Non-loaded Q |
|---|---|---|---|
| Comparative Example 18 | 0.6 | 0.3 | 1460 |
| Comparative Example 19 | 0.8 | 0.4 | 1400 |
| Comparative Example 20 | 1.0 | 1.6 | 1000 |
| Comparative Example 21 | 2.1 | 2.1 | 920 |
| Comparative Example 22 | 2.5 | 2.5 | 830 |
| Comparative Example 23 | 2.1 | 2.1 | 900 |
| Comparative Example 24 | 2.8 | 2.5 | 800 |

INDUSTRIAL APPLICABILITY

As mentioned above, the dielectric ceramic composition for high-frequency use according to the invention can be used to produce a dielectric ceramic electronic component for high-frequency use such as a communication filter or the like.

As mentioned above, the dielectric ceramic for high-frequency use according to the invention is most suitable as, for example, a constitutive member of a high-frequency circuit element such as integrated circuit or the like used in a high-frequency region such as microwave, milliwave or the like, since it is low in the dielectric constant, high in the $Q_m$ value and excellent in the temperature properties.

| | REFERENCE SIGNS LIST |
|---|---|
| 1 | Coaxial dielectric resonator |
| 2 | Supporting member |
| 3 | Dielectric ceramic substrate |
| 4 | Strip conductor |
| 5 | Metal case |
| H | Electromagnetical field |
| 6 | Dielectric ceramic substrate |
| 7 | Strip conductor |
| 8 | Ground conductive film |
| 9 | High-frequency planar circuit |

The invention claimed is:

1. A dielectric ceramic composition for high-frequency use characterized by being represented by a composition formula of $a(Sn,Ti)O_2$-$bMg_2SiO_4$-$cMgTi_2O_5$-$dMgSiO_3$ in which a, b, c and d (provided that a, b, c and d are mol %) are within the following ranges: $4 \leq a \leq 37$, $34 \leq b \leq 92$, $2 \leq c \leq 15$ and $2 \leq d \leq 15$, respectively, and $a+b+c+d=100$, and the $(Sn,Ti)O_2$ is $(Sn_{0.8},Ti_{0.2})O_2$ or $(Sn_{0.2},Ti_{0.8})O_2$.

2. A dielectric ceramic composition for high-frequency use according to claim 1, wherein the $(Sn,Ti)O_2$ is $(Sn_{0.8},Ti_{0.2})O_2$.

3. A method for producing a dielectric ceramic composition for high frequency use as claimed in claim 1 characterized by comprising stops of mixing and crushing predetermined amounts of $SnO_2$, $TiO_2$ and $Mg_2SiO_4$ as a starting material to obtain a powder, and then adding a binder to the obtained powder, molding and sintering.

4. A dielectric ceramic for high-frequency use characterized by comprising a main component consisting of a dielectric ceramic composition for high-frequency use as claimed in claim 1 and an adding component consisting of MnO, wherein 0.1-5.0 parts by weight of the adding component is added to 100 parts by weight of the main component, and wherein a relative density is not less than 95%.

5. A dielectric ceramic for high-frequency use according to claim 4, which has a relative permittivity $\in_r$ of 7.5-12.0, a $Q_m \times f_o$ value of not less than 50000 and a temperature coefficient $\tau_f$ of resonance frequency $f_o$ of −30 to +30 ppm/°C.

6. A method for producing a dielectric ceramic for high-frequency use as claimed in claim 4 characterized by comprising steps of mixing and calcining predetermined amounts of $SnO_2$, $TiO_2$ and $Mg_2SiO_4$, and then crushing them to obtain a starting material, and then adding 0.1-5.0 parts by weight of MnO as is sintering aid based on 100 parts by weight of the starting material to obtain a powder, and thereafter adding an organic binder to the obtained powder, molding and sintering.

7. A high-frequency circuit element characterized by comprising a member composed of a dielectric ceramic for high-frequency use as claimed in claim 4.

8. A dielectric ceramic for high-frequency use characterized by being composed of a dielectric ceramic composition for high-frequency use as claimed in claim 1 and having a surface arithmetic mean roughness Ra of not more than 2 μm.

9. A dielectric ceramic for high-frequency use according to claim 8, which has a relative permittivity $\in_r$ of 7.5-12.0, a $Q_m \times f_o$ value of not less than 50000 and a temperature coefficient $\tau_f$ of resonance frequency $f_o$ of −30 to +30 ppm/°C.

10. A method for producing a dielectric ceramic for high-frequency use as claimed in claim 8 characterized by comprising steps of mixing and crushing predetermined amounts of $SnO_2$, $TiO_2$ and $Mg_2SiO_4$ as a starting material to obtain a powder such that D50 of particle size distribution is not more than 2 μm, and then adding a binder to the obtained powder, molding and sintering.

11. A high-frequency circuit element characterized by comprising a member composed of a dielectric ceramic for high-frequency use as claimed in claim 8.

* * * * *